(12) United States Patent
Dworsky et al.

(10) Patent No.: US 6,967,667 B2
(45) Date of Patent: Nov. 22, 2005

(54) METHOD OF CONSTRUCTING A KALEIDOSCOPE IMAGE USABLE IN A SCRAPBOOK

(75) Inventors: Howard K. Dworsky, Rochester, NY (US); Andrew T. Cooper, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 361 days.

(21) Appl. No.: 09/961,485

(22) Filed: Sep. 24, 2001

(65) Prior Publication Data
US 2003/0058254 A1    Mar. 27, 2003

(51) Int. Cl.[7] .............................................. G06T 3/00
(52) U.S. Cl. ...................... 345/646; 345/635; 345/647
(58) Field of Search ............................... 345/635, 646, 345/647

(56) References Cited

U.S. PATENT DOCUMENTS

| | | | |
|---|---|---|---|
| 6,091,423 A | 7/2000 | Shiraishi et al. ............ | 345/433 |
| 6,300,983 B1 * | 10/2001 | Fels et al. ................... | 348/580 |
| 6,450,090 B1 * | 9/2002 | Wridge, Jr. .................. | 101/40 |
| 6,554,504 B2 * | 4/2003 | Cook et al. ................. | 396/567 |

OTHER PUBLICATIONS

Ulead Photo Express 4.0 User Guide. Dec. 2000, pp. 1-48.*
Ulead Photo Express 4.0 My Scrapbook User Guide, Dec. 2000, pp. 1-6.*
Ulead PhotoImpact 6.0 product description, Jun. 21, 2004, Grafticssoft, published at http://graphicssoft.about.com/library/weekly/aa001018h.htm.*
Ulead PhotoImpact 3.0 product description, Jun. 21, 2004, Designer-Info, published at Ulead PhotoImpact 6.0 product description, Grafticssoft, published at http://www.designer-info.com/.*
Ulead PhotoImpact 4.0 product description, Jun. 21, 2004, Designer-Info, published at Ulead PhotoImpact 6.0 product, Grafticssoft, published at http://www.designer-info.com/.*
Ulead PhotoImpact 6.0 product description, Feb. 2001, Australian PC Authority, published at http://www.pcauthority.com.au.*
Stephanie Baker-Thomas, Fun with PhotoImpact 4.2, 1999, East of the Sun Publishing, pp. 102-112, 120, and 121.*
"The Silicon Mirror & Kaleidoscope" article.
"QX3 Interactive Software" article.
"Ulead PhotoImpacts" article by Rick Limpert.

* cited by examiner

Primary Examiner—Jeffery A. Brier
(74) Attorney, Agent, or Firm—David A. Novais (57) ABSTRACT

A method of producing a kaleidoscope image which is usable in a scrapbook. The method includes the steps of providing a first display area for displaying an image; providing a window which is movable by a user relative to the image displayed in the first display area to produce a windowed image comprised of a portion of the image; and simultaneously displaying, in a second display area adjacent the first display area, the kaleidoscope image having a symmetrical design produced by arranging a series of the windowed image displayed in the first display area.

24 Claims, 12 Drawing Sheets

METHOD OF CONSTRUCTING A KALEIDOSCOPE IMAGE USABLE IN A SCRAPBOOK

FIELD OF THE INVENTION

The present invention relates generally to forming a scrapbook page or a portion of a scrapbook page which can be inserted into a scrapbook.

BACKGROUND OF THE INVENTION

A scrapbook album is a collection of scrapbook pages, each of which is a unique collection of at least photographs, paper crafts, and journaling. In general, each scrapbook page or a group of pages are based on a theme, and all of the components that make up that page(s) are in context with the theme. For example, a scrapbook page having a "holiday" theme would comprise photographs taken during that particular holiday, and paper craft depicting the holiday, for instance, a valentine heart cut out of red construction paper or a purchased die cut. In addition, the person making the scrapbook page would record information about the holiday, including who was shown in the photographs on the page(s) in the form of journaling. All of the components of a scrapbook page are arranged in an aesthetically pleasing manner which best depicts the essence of the theme. The components are typically glued in place, and the assembled scrapbook page is inserted into a scrapbook album. A purpose of making a scrapbook page versus simply placing photographs in a standard photo album is to create a unique, personalized family heirloom which tells a story and will be cherished for a lifetime, and which will perhaps be passed on to a next generation. The task of creating a scrapbook page provides benefit to those participating in the craft as well as the recipient of the completed scrapbook album.

Novice scrapbookers often look to others for inspiration when organizing a new page layout. Experienced scrapbookers will share their scrapbook page layouts for creative inspiration, and because they are a source of pride for the creator. Scrapbook magazines show themed page layouts with a description on how to assembly a page, and the materials needed to get the desired results.

The scrapbook business has grown over the past several years. Today, there are scrapbook specialty stores, magazines devoted to the craft, and a plurality of websites offering on-line merchandise sales and creative tips. The type of merchandise available for this craft segment has grown substantially. Today, a person can purchase scrapbook specialty items including scissors to cut a variety of patterns, pre-printed patterned paper, paper in all colors of the rainbow, specialty pens, and specialty adhesives. However, on the other hand, the type of still photograph included in a scrapbook has gone relatively unchanged over 100 years.

With the advent of digital imaging, still photographs can take on whole new look. Even if the original photograph was captured using an analog camera, the photograph can be scanned to create a digital copy of the original photograph. Once a photograph is in digital form, using digital editing techniques, a person can create distinctive looking composite images from the same or different photographs. The avid scrapbooker is continually looking for new ways to make a scrapbook page layout, the latest technique to use, or a new product to try in their scrapbook. However, most of the present methods used by scrapbookers are fairly complex and use only a single image of the same scene.

A kaleidoscope is a small tube in which mirrors reflect light transmitted through bits of loose colored glass contained at one end, causing them to appear as symmetrical designs when viewed at the other end. Children and adults enjoy the images produced using a kaleidoscope. Scrapbookers have tried to create images similar to those produced by a kaleidoscope, hereinafter referred to as a kaleidoscope image, using their personal images. First a reverse negative is made from an original image or negative, then multiple photographic prints are required from the reverse negative as well as from the original image. Next, the same image area in the form of a triangle is cropped out of each print to form a kaleidoscope segment. The kaleidoscope segments are arranged such that every other segment is one from the original image. The number of kaleidoscope segments desired determine the angles of the triangle, and the angles of the triangle have to be exact in order for the segments to fit together properly. This is not an easy task for scrapbookers, but the result is appealing, and resembles the effect viewed through a traditional kaleidoscope.

Attempts have been made to create kaleidoscope images using a computer and image editing software. For instance, QX3 Special Effects Interactive software provides a filter to produce "beautiful images that resemble patterns commonly seen in reflecting/refracting kaleidoscopes". Ulead photoImpact 5 or Ulead Photo Express V4.0 is image modifying software which provides a kaleidoscope filter to generate a patterned image.

While such software programs may provide a kaleidoscope-type image, the software programs are not suitable for use by a scrapbooker. The software programs are expensive and complex and therefore intended for use of an image specialist, for example, in creating web pages or doing special effects for videos and movies.

In addition, the software programs do not produce a kaleidoscope image desired by a scrapbooker. A scrapbooker is interested in producing an aesthetically pleasing image which focuses on and promotes the subject of the image, while the software programs disclosed above provide patterning for special effects.

Still further, the software programs disclosed above do not provide immediate, simultaneous feedback to the scrapbooker as to how the kaleidoscope image would be formed/produced.

Yet further, while a user may be able to create a kaleidoscope-type image on their home computer using one of the above mentioned software programs, the print created on their home printer, typically an inkjet printer, may not have the archival properties and quality desired by a scrapbooker. For example, the printed image may not be acid free, a characteristic desired by scrapbookers for long term archival.

Accordingly, there exists a need for a method of constructing a kaleidoscope image which usable in a scrapbook. The method needs to be low cost, easy to use, accessible for the sporadic, intermittent use of scrapbookers, and produce a high quality, archival print.

It is an advantage of the present invention that scrapbookers can provide at least one image and receive a kaleidoscope image made from a portion of the at least one image, and the kaleidoscope image can be fixed to a page to provide an aesthetically pleasing scrapbook page. It is a further advantage of the present invention to provide a simple, low cost method, which permits a scrapbooker to construct a kaleidoscope visual image derived from a scrapbooker-provided image which can be printed on a high quality, archival medium.

SUMMARY OF THE INVENTION

An object of the present invention is to provide a method of constructing a kaleidoscope image usable in a scrapbook.

Another object of the present invention is to construct such a kaleidoscope image using an image provided by a user.

Still another object of the present invention is to provide a method of constructing such a kaleidoscope image which is low cost, easy to use, and provides a high quality, archival print.

These objects are given only by way of illustrative example. Thus, other desirable objectives and advantages inherently achieved by the disclosed invention may occur or become apparent to those skilled in the art. The invention is defined by the appended claims.

According to one aspect of the present invention, there is provided a method of producing a kaleidoscope image which is usable in a scrapbook. The method comprises the steps of providing a first display area for displaying an image; providing a window which is movable by a user relative to the image displayed in the first display area to produce a windowed image comprised of a portion of the image; and simultaneously displaying, in a second display area adjacent the first display area, the kaleidoscope image having a symmetrical design produced by arranging a series of the windowed image displayed in the first display area.

According to another aspect of the present invention, there is provided a method of constructing a kaleidoscope image which is usable in a scrapbook. The method includes the steps of: (a) selecting in a first display area, by moving a predetermined window, a portion of a displayed image and automatically creating a plurality of windowed images which are simultaneously displayed, in a second display area, as part of the kaleidoscope image; (b) adjusting the position or size of the predetermined window to display new windowed images which are simultaneously displayed in the second display area as part of the kaleidoscope image; and (c) a user selecting one of the displayed kaleidoscope images for storage or printing for subsequent use in the scrapbook.

According to a still further aspect of the present invention, there is provided a method of constructing a kaleidoscope image which is usable in a scrapbook. The method includes the steps of: (a) displaying an image in a first display area; (b) selecting, by moving a predetermined window, a first portion of the displayed image and creating a plurality of windowed images which are simultaneously displayed in a second display area as part of the kaleidoscope image; (c) mirroring the first portion of the displayed image and creating a plurality of mirrored images which are displayed as part of the kaleidoscope image by interspersing the plurality of windowed images with the plurality of mirrored images; (d) adjusting the position or size of the predetermined window to select new first portions which are simultaneously displayed as part of the kaleidoscope image in the second display area and include the windowed and mirrored images; and (e) a user selecting one of the displayed kaleidoscope images for storage and/or printing, and subsequent use in the scrapbook.

According to yet another aspect of the present invention, there is provided a method of constructing a kaleidoscope image which is usable in a scrapbook. The method includes the steps of: (a) selecting in a first display area, by moving a predetermined window, a portion of a displayed image and automatically creating from the selected portion a plurality of windowed images; (b) simultaneously displaying, in a second display area, the kaleidoscope image comprising the windowed images created using the portion selected in the first display area; (c) generating a mirrored portion by mirroring the selected portion about one of its edges and automatically creating a plurality of mirrored images from the mirrored portion; (d) forming visual images of the plurality of windowed images and mirrored images on a medium; (e) providing instructions on the medium for cutting out and fixing the plurality of visual images to produce the kaleidoscope image having a symmetrical design; and (f) storing, printing, or transferring the medium comprising the visual images and instructions.

According to still another aspect of the present invention, there is provided a scrapbook page including a kaleidoscope image produced by each of the methods disclosed above.

The present invention provides a method of constructing a kaleidoscope image, using an image provided by a user, which usable in a scrapbook. The method is low cost, easy to use, accessible for sporadic, intermittent use, and produces a high quality, archival print.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 9b shows a kaleidoscope image formed using the pie-shaped window shown in FIG. 9a.

FIG. 10b shows a kaleidoscope image formed using the diamond-shaped window shown in FIG. 10a.

FIG. 11b shows a kaleidoscope image formed using the irregular-shaped window shown in FIG. 11a.

DETAILED DESCRIPTION OF THE INVENTION

The following is a detailed description of the preferred embodiments of the invention, reference being made to the drawings in which the same reference numerals identify the same elements of structure in each of the several figures.

Figure 1:
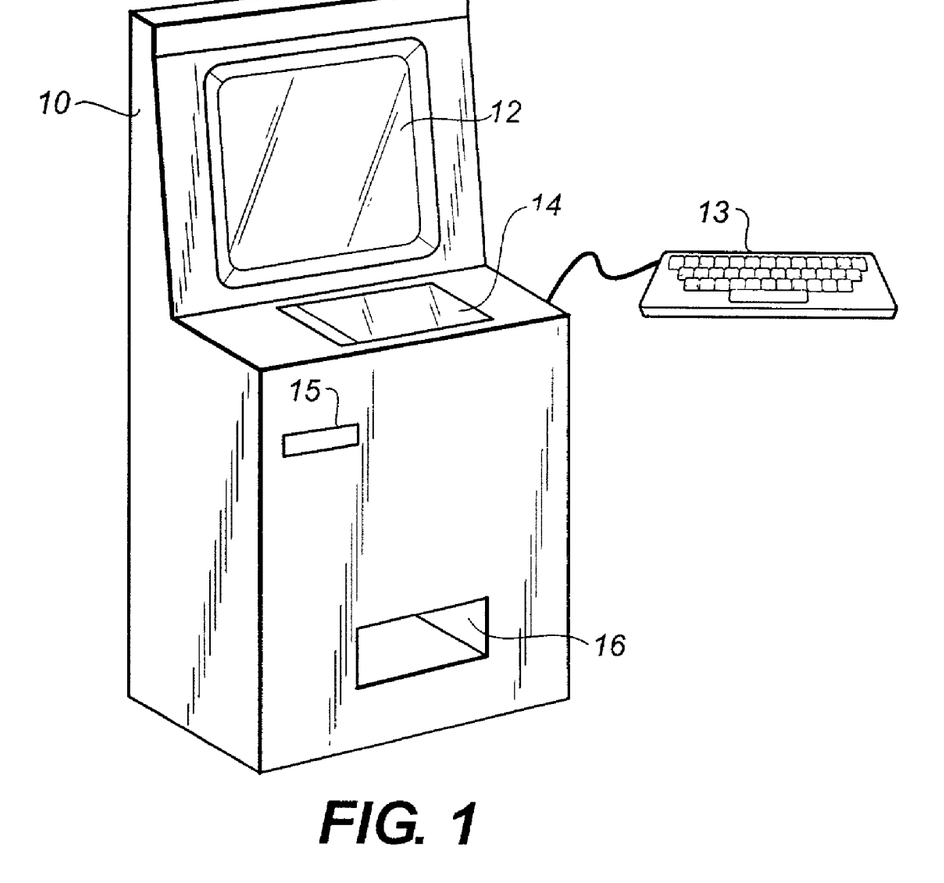
FIG. 1 shows an image producing device in accordance with the present invention.

The present invention employs an image making apparatus or image producing device 10. An example of an image producing device 10 is a Picture Maker™ kiosk produced by Eastman Kodak Company. Image producing device 10 is generally illustrated in FIG. 1. Image producing device 10 includes a color display 12 for presenting information to a user/scrapbooker. Color display 12 can be a touchscreen display, whereby a user can provide information and data to image producing device 10, or a keyboard 13 may be used to provide information and data. A scanner 14 may be provided for receiving a user-supplied visual image and converting the visual image into digital form. Alternatively, an input port 15 may be provided for receiving the user-supplied visual image in digital form, such as from a memory card, floppy disk, compact disc, or PictureCD. Image producing device 10 further includes a delivery section 16 for controlling the delivery of a medium. Delivery section 16 is illustrated in FIG. 1 as an opening in image producing device 10.

Figure 2:
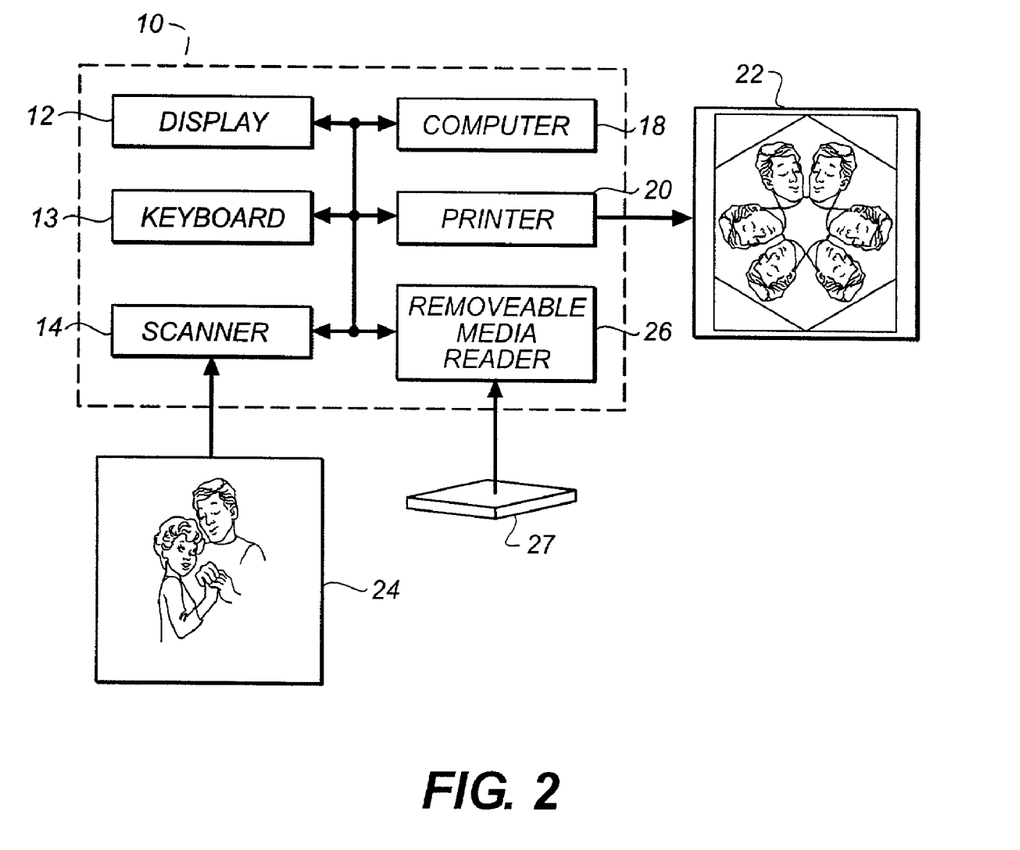
FIG. 2 generally shows a diagram of included functions of the image producing device of FIG. 1.

FIG. 2 generally shows a diagram of included functions of image producing device 10. As illustrated, image producing device 10 includes keyboard 13 for entering information/data into a computer 18. Computer 18 typically manages the flow of information and functionality of the components of image producing device 10. Internal to image producing device 10 is a printer 20, an example of which is the Kodak Digital Science Model 8650 manufactured by Eastman Kodak Company. Printer 20 responds to commands of computer 18 for forming a kaleidoscope image on a medium such as thermal or ink-jet paper. An example of a kaleidoscope image is illustrated in FIG. 2 at 22 which was formed from a user-supplied visual image 24. As described above, another method of receiving user-supplied visual image 24 is illustrated by a removable media reader 26 for receiving removable media 27, for example, a memory card, floppy disk, compact disc, PictureCD, or other form of removable media used in transferring digital files.

Figure 3:
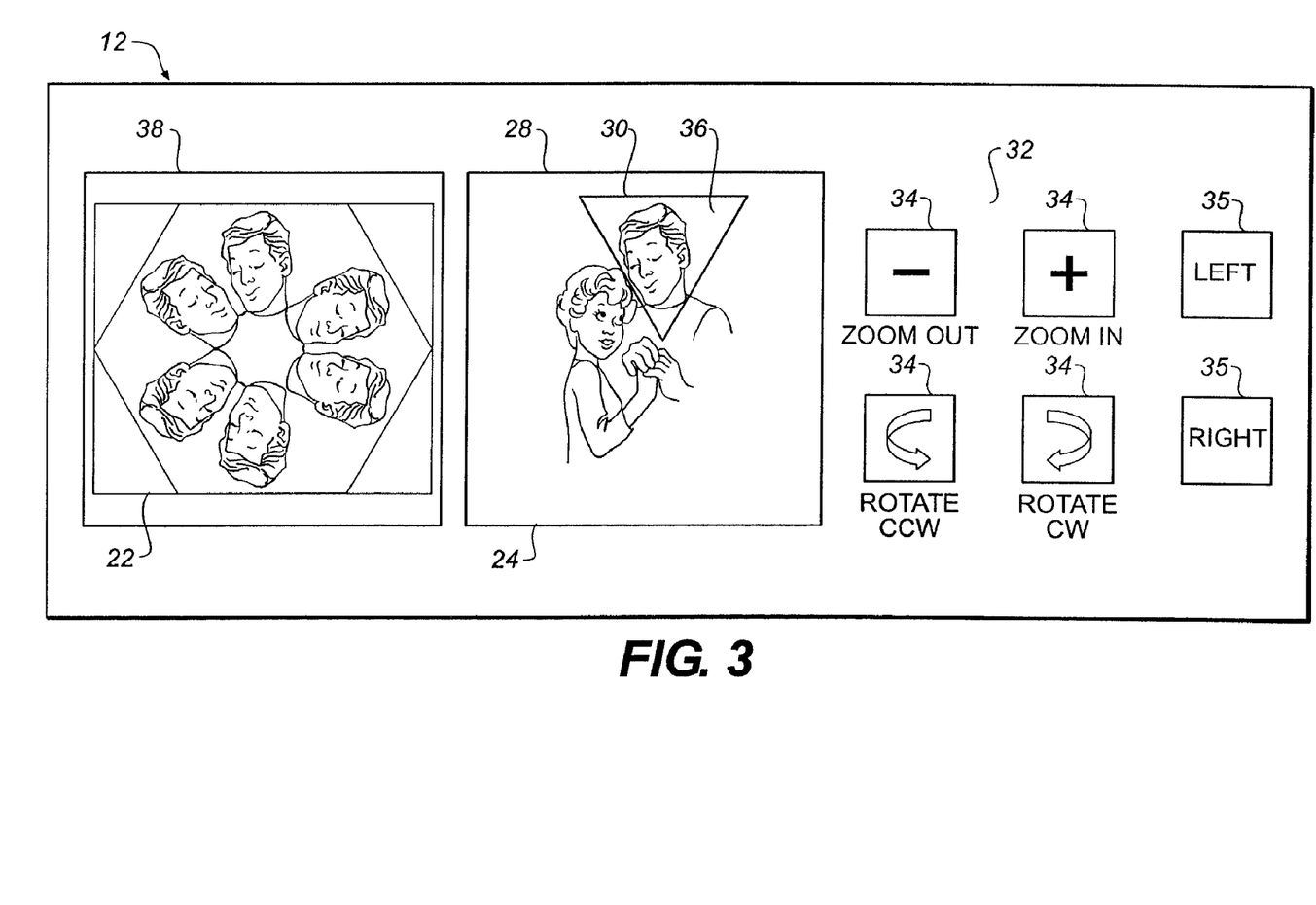
FIG. 3 shows a display of image producing device shown in FIG. 1 illustrating the construction of a kaleidoscope image in accordance with the present invention using an equilateral triangle.

Referring now to FIG. 3 there is shown display 12 of image producing device 10. Display 12 includes a first display area 28 for displaying user-supplied image 24. A window 30 is provided in first display area 28 which is movable by a user relative to user image 24 displayed in first display area 28. An instruction area 32 disposed within display 12 includes one or more text and/or touchscreen buttons, instructional members, icons, or indicators 34 for moving and/or adjusting window 30 within first display area 28. As shown in FIG. 3, indicators 34 include a zoom in/out feature and rotation feature. Additional features known to those skilled in the art may be desired. Alternatively, keyboard 13 could be used to move window 30 within first display area 28.

Window 30 is movable within first display 28 area by a user using their finger on the touchscreen display 12 and dragging window 30 to the desired location. Window 30 can also be modified in size and orientation using indicators 34 whereby window 30 overlaps a portion of image 24 to produce a windowed image 36 comprising the portion of image 24 disposed within window 30. For the example illustrated in FIG. 3, image 24 displayed in first display area 28 depicts a man and woman holding hands while windowed image 36 consists of the facial image of the man.

A second display area 38 is disposed in display 12 adjacent first display area 28. Simultaneous with window 30 being moved within first display 28, kaleidoscope image 22 (i.e. a kaleidoscope version of windowed image 36) is displayed within second display area 38. Kaleidoscope image 22 is a symmetrical design produced by arranging a series of windowed image 36 displayed in first display area 28. That is, instantaneous with windowed image 36 being produced in first display area 28 by moving window 30, kaleidoscope image 22 is displayed in second display area 38. Being able to dynamically produce/display kaleidoscope image 22 as window 30 is moved around image 24 provides a scrapbooker with immediate feedback. As such, kaleidoscope image 22 is formed dynamically and simultaneously, thereby allows a scrapbooker to immediately understand the kaleidoscope image that would be formed. Much time and effort is saved in providing the desired, aesthetically pleasing image kaleidoscope image sought by the scrapbooker. In addition, the feature of simultaneously forming the kaleidoscope image provides an easy to use system for a casual user.

The format of a typical display 12 is landscape, that is, the width is longer than the height. As previously stated, second display area 38 is adjacent first display area 28, therefore one possible layout format is to arrange first and second display area 28,38 side by side in display 12. If display 12 employs a touchscreen feature, a right handed user will typically use a finger on his/her right hand to move window 30 in first display area 28. As such, if first display area 28 is located to the right of second display area 38 (as shown in FIG. 3), then the user will have an unobstructed view of second display area 38. If the user uses his/her left handed, then their hand/arm may obstruct their view of second display area 38. To overcome this problem, instruction area 32 may include a format selector 35 to enable the user to select the layout of color display 12. An example of a possible format selector 35 is illustrated in FIG. 3 as buttons to select a left or right-handed layout. A right-handed layout places first display area 28 to the right of second display area 38 when viewing the display. A left-handed layout places first display area 28 to the left of second display area 38 when viewing the display.

Figure 4:
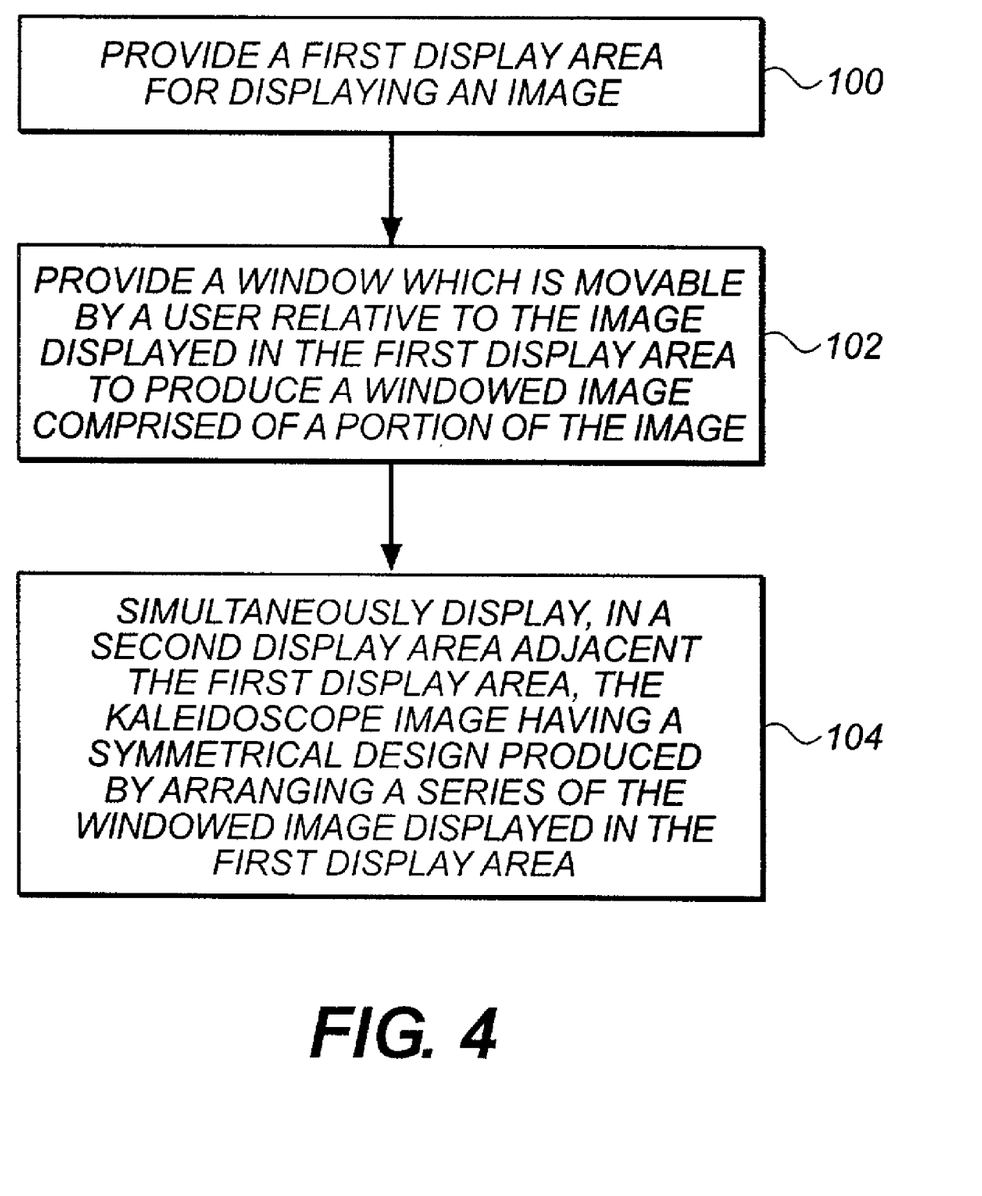
FIG. 4 shows a flow diagram of a method of constructing a kaleidoscope image in accordance with the present invention.

FIG. 4 provides a flow chart of the method for producing kaleidoscope image 22 which is usable in a scrapbook. At step 100, first display area 28 is provided for displaying user-supplied image 24. Window 30 is provided which is movable by a user relative to image 24 displayed in first display area 28 to produce windowed image 36 comprised of a portion of image 24 (step 102). At step 104, kaleidoscope image 22 is simultaneously displayed, in second display area 38 adjacent first display area 28, wherein kaleidoscope image 22 has a symmetrical design produced by arranging a series of windowed image 36 displayed in first display area 28.

Once kaleidoscope image 22 has been produced, kaleidoscope image 22 can be stored, transmitted, or printed for use in the scrapbook. If printed, kaleidoscope image 22 can be printed on a page which could itself be placed in scrapbook. Alternatively, kaleidoscope image 22 could be printed on a sheet, cut out and fixed to a page which can be used in a scrapbook.

Figure 5:
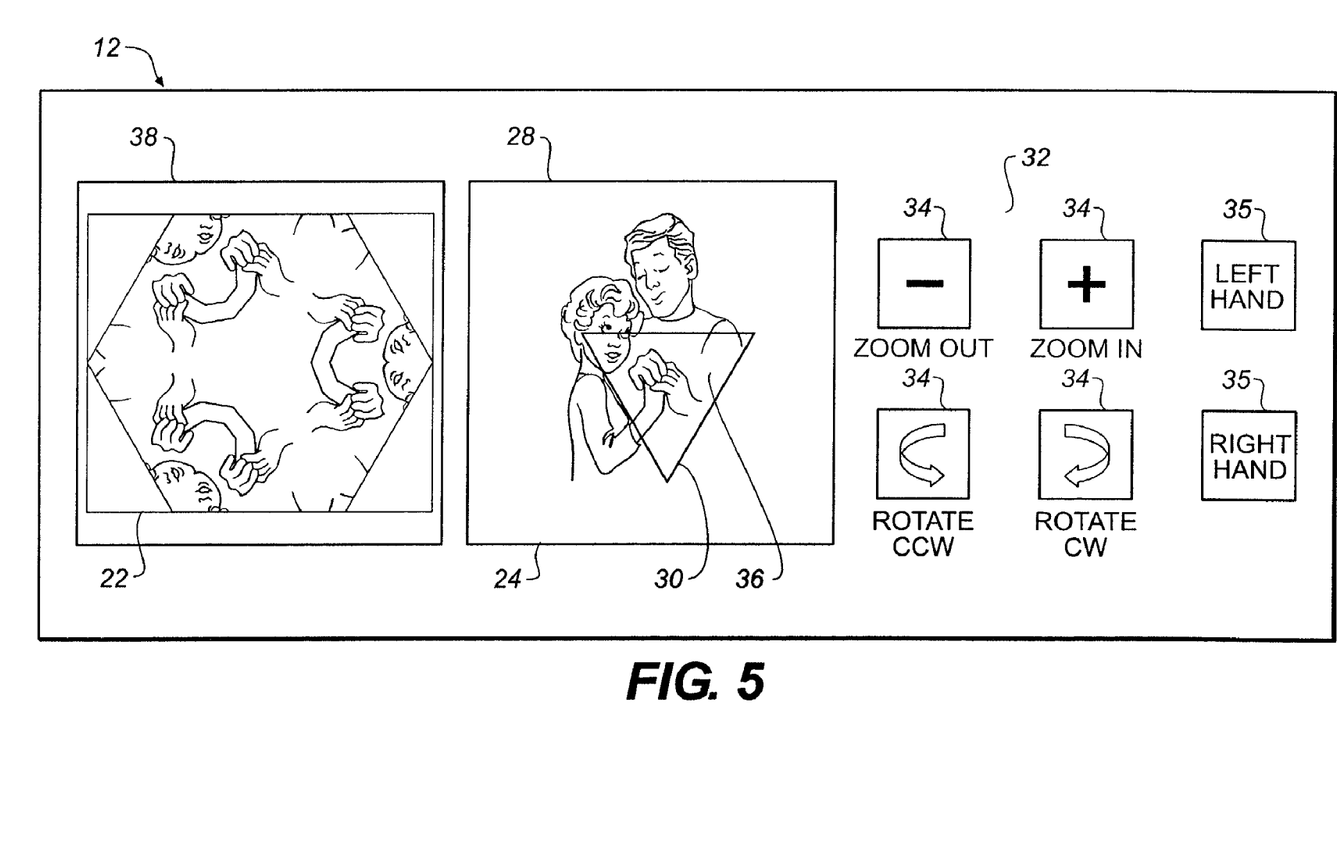
FIG. 5 shows the display of FIG. 3 illustrating the movement of the window in the first display area in accordance with the present invention.

Referring now to FIG. 5, window 30 has been moved within first display area 28, for example by the user using their finger on touchscreen display 12 and dragging window 30 to the desired location, so as to have a different placement than that shown in FIG. 3. Windowed image 36 shown in FIG. 5 now frames the clasped hands of the couple. Kaleidoscope image 22 displayed in second display area 38 is produced by arranging a series of windowed image 36 displayed in the first display area. Accordingly, kaleidoscope image 22 displayed in FIG. 5 shows the clasped hands arranged in a kaleidoscope design.

Figure 6A:
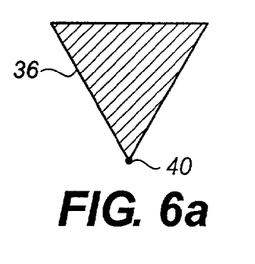
FIGS. 6a–6f show the construction of a kaleidoscope image in accordance with the present invention using a windowed image.
Figure 6B:
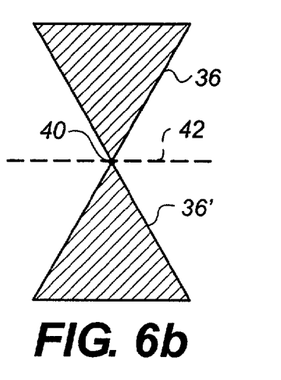
Figure 6C:
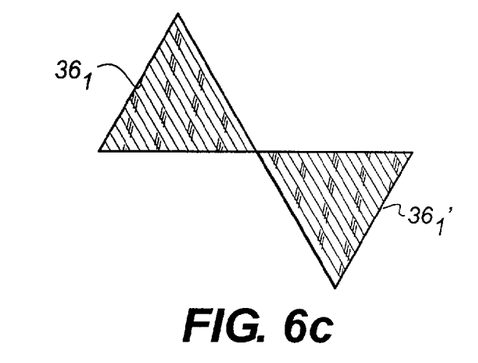
Figure 6D:
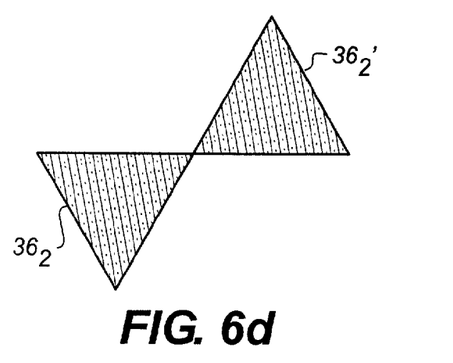
Figures 6E, 6F:
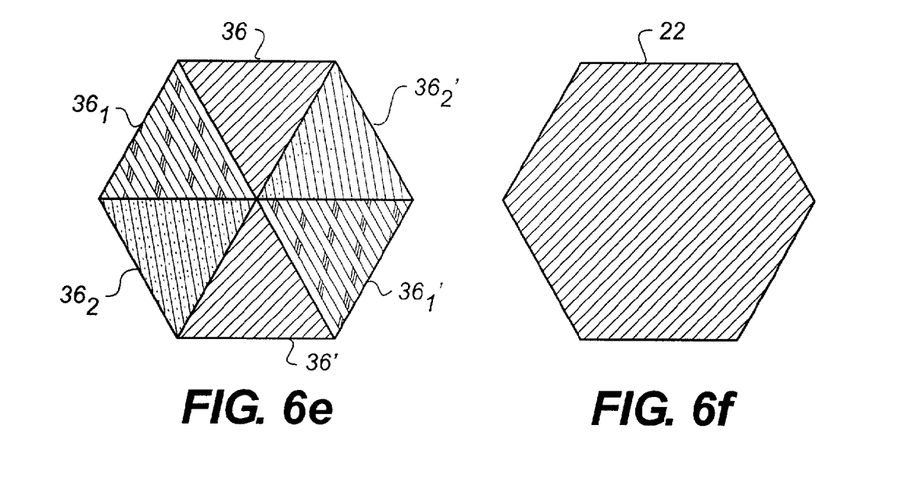

Window 30 is shown in FIGS. 3 and 5 as an equilateral triangle. As such, the kaleidoscope image formed with equilateral triangle is six-sided. FIGS. 6a–6f illustrate one method of generating kaleidoscope image 22 formed using a window having an equilateral triangle shape. Windowed image 36 is shown in FIG. 6a as including an origin 40. Windowed image 36 is mirrored about an axis 42 located at origin 40 to produce a mirrored image 36', as shown in FIG. 6b. Windowed image 36 and mirrored image 36' are then rotated 60 degrees counterclockwise to form images $36_1$ and $36_1'$, respectively, as shown in FIG. 6c. Windowed image 36 and mirrored image 36' are then rotated 60 degrees clockwise to form images $36_2$ and $36_2'$, respectively, as shown in FIG. 6d. The images of FIGS. 6b through 6d are merged together, as shown in FIG. 6e, to form a six-sided kaleidoscope image 22, shown generally in FIG. 6f. As such, kaleidoscope image 22 is formed by radially arranging a series of windowed images 36 and mirrored images about a center point wherein origin 40 of each windowed image 36 is disposed at the center point.

Those skilled in the art may recognize addition methods to generate kaleidoscope image 22 from windowed image 36. For example, windowed image 36 could be mirrored about one of its edges radiating from origin 40 to generate the mirrored image. Then, kaleidoscope image 22 would be generated by radially arranging a plurality of windowed images 36 and the mirrored images in an alternating pattern about a center point wherein origin 40 of each windowed image and mirrored image is disposed at the center point. As such, kaleidoscope image 22 includes a plurality of mirrored images interspersed with the plurality of windowed images.

Figure 7:
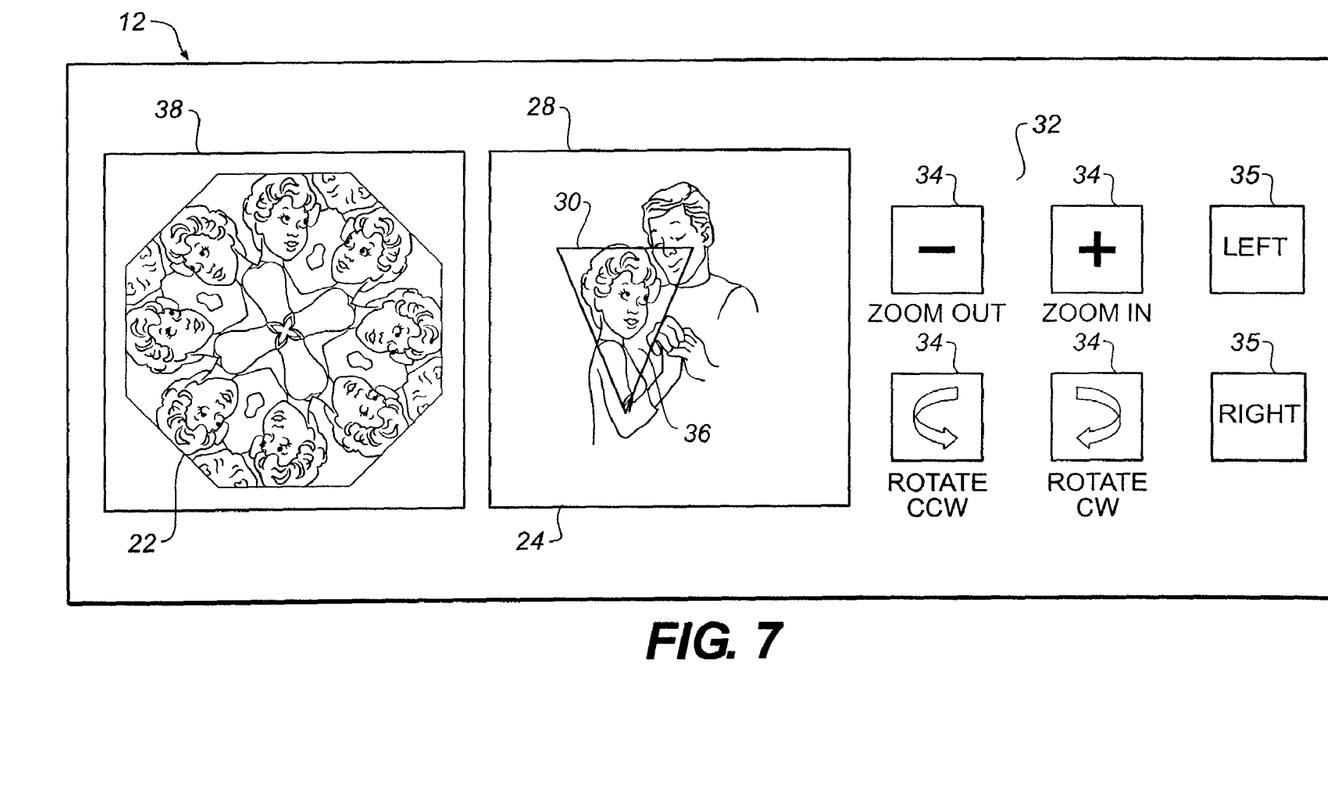
FIG. 7 shows a display of image producing device illustrating the construction of a kaleidoscope image in accordance with the present invention using a non-equilateral triangle.
Figure 8:
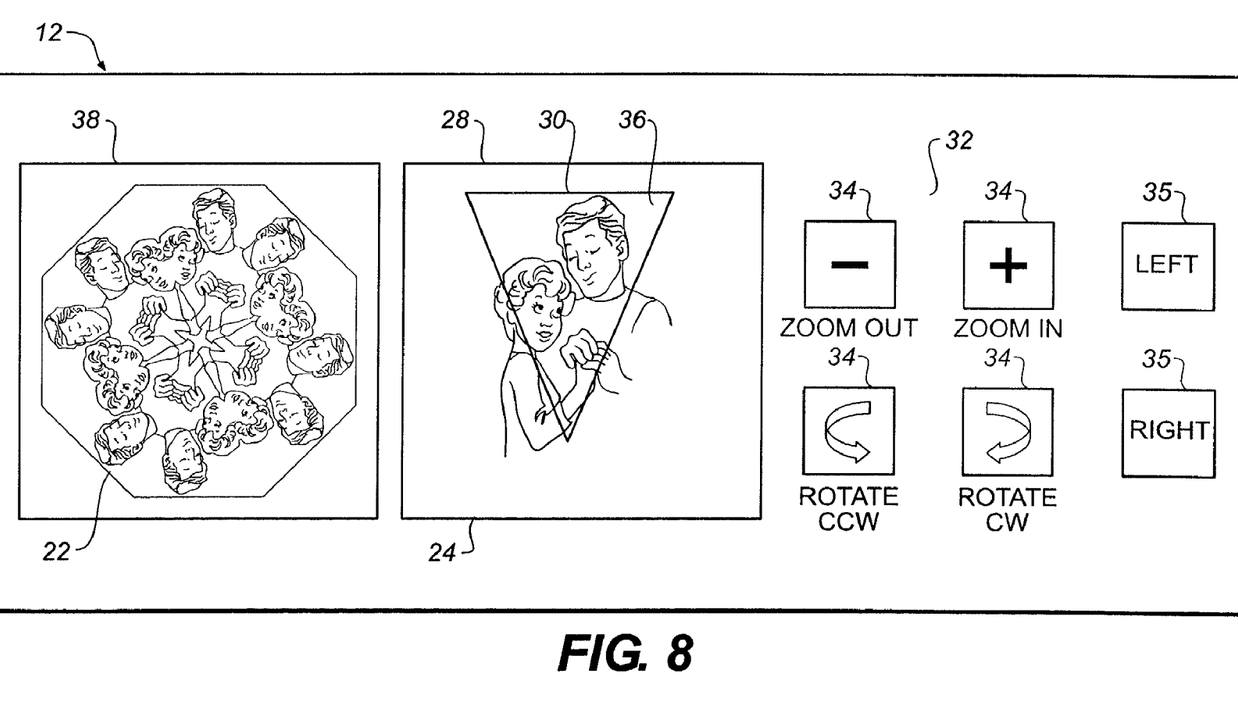
FIG. 8 shows the display of FIG. 7 illustrating the adjustment of the window in the first display area in accordance with the present invention.

Window 30 may have a triangular shape different from an equilateral triangle. For example, FIG. 7 shows window 30 having a triangular shape which is not an equilateral triangle. Accordingly, for this particular triangular window 30, kaleidoscope image 22 displayed in second display area 38 is eight-sided. The shape of window can be adjusted using indicators 34. For example, adjusting window 30 from an equilateral triangle shape to a non-equilateral triangle shape. Similarly, indicators 34 can be used to adjust the size of window 30. For example, window 30 of FIG. 8 has increased in size as compared to window 30 of FIG. 7.

Accordingly, a kaleidoscope image which is usable in a scrapbook can be constructed by moving predetermined window 30 and selecting in first display area 28 a portion of displayed image 24 and automatically creating a plurality of windowed images 36 which are simultaneously displayed in second display area 38 as part of kaleidoscope image 22. The position or size of predetermined window 30 can be adjusted to display new windowed images 36 which are simultaneously displayed in second display area 38 as part of the kaleidoscope image 22. A user selects one of the displayed kaleidoscope images for transmitting, storage or printing for subsequent use in the scrapbook.

Figure 9A:
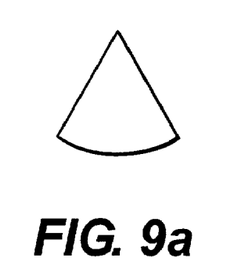
FIG. 9a shows a pie-shaped window suitable for use with the present invention.
Figure 9B:
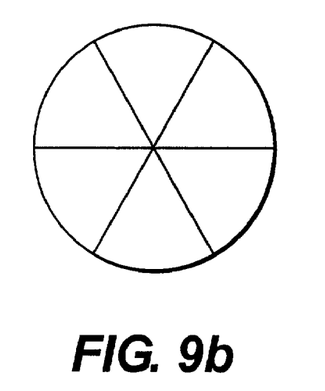
Figure 10A:
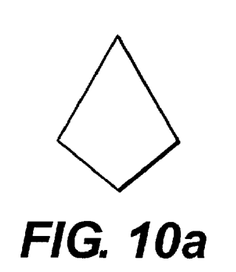
FIG. 10a shows a diamond-shaped window suitable for use with the present invention.
Figure 10B:
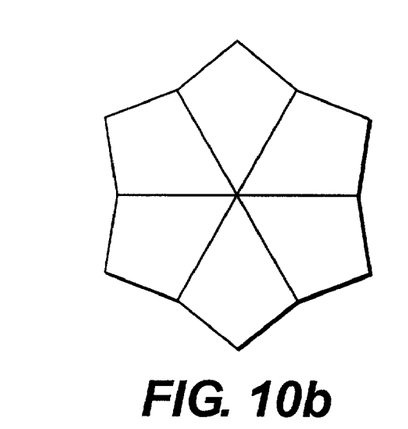
Figure 11A:
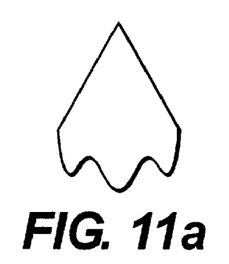
FIG. 11a shows a irregular-shaped window suitable for use with the present invention.
Figure 11B:
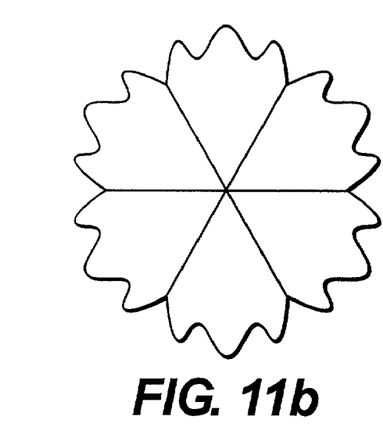

Window 30 may comprise a shape other than a triangular shape, and the corresponding kaleidoscope image would be generated using the windowed image. For example, FIG. 9a shows a pie-shaped window, with a corresponding kaleidoscope image formed using the pie-shaped window being shown in FIG. 9b. Note that the kaleidoscope image of FIG. 9b forms a round shape. Similarly, FIG. 10a shows a four-sided diamond shaped window, with a corresponding kaleidoscope image formed using the diamond-shaped window being shown in FIG. 10b. Note that the kaleidoscope image of FIG. 10b forms a star shape. Further, FIG. 11a shows an irregularly shaped window, with a corresponding kaleidoscope image formed using the irregularly window being shown in FIG. 11b. Note that the kaleidoscope image of FIG. 11b forms an irregular shape. Those skilled in the art will recognize additional shapes that may be used as window 30.

To promote the dynamic and simultaneous generation of kaleidoscope image 22 from windowed image 36, a low resolution image of kaleidoscope image 22 may be generated and displayed in second display area 38. Accordingly, image 24 displayed in first display area 28 may be displayed as a low resolution image. However, when the scrapbooker desires to store, transmit, or print kaleidoscope image 22, a full resolution image of kaleidoscope image 22 would be stored, transmitted, or printed from a full resolution image of image 24.

Figure 12:
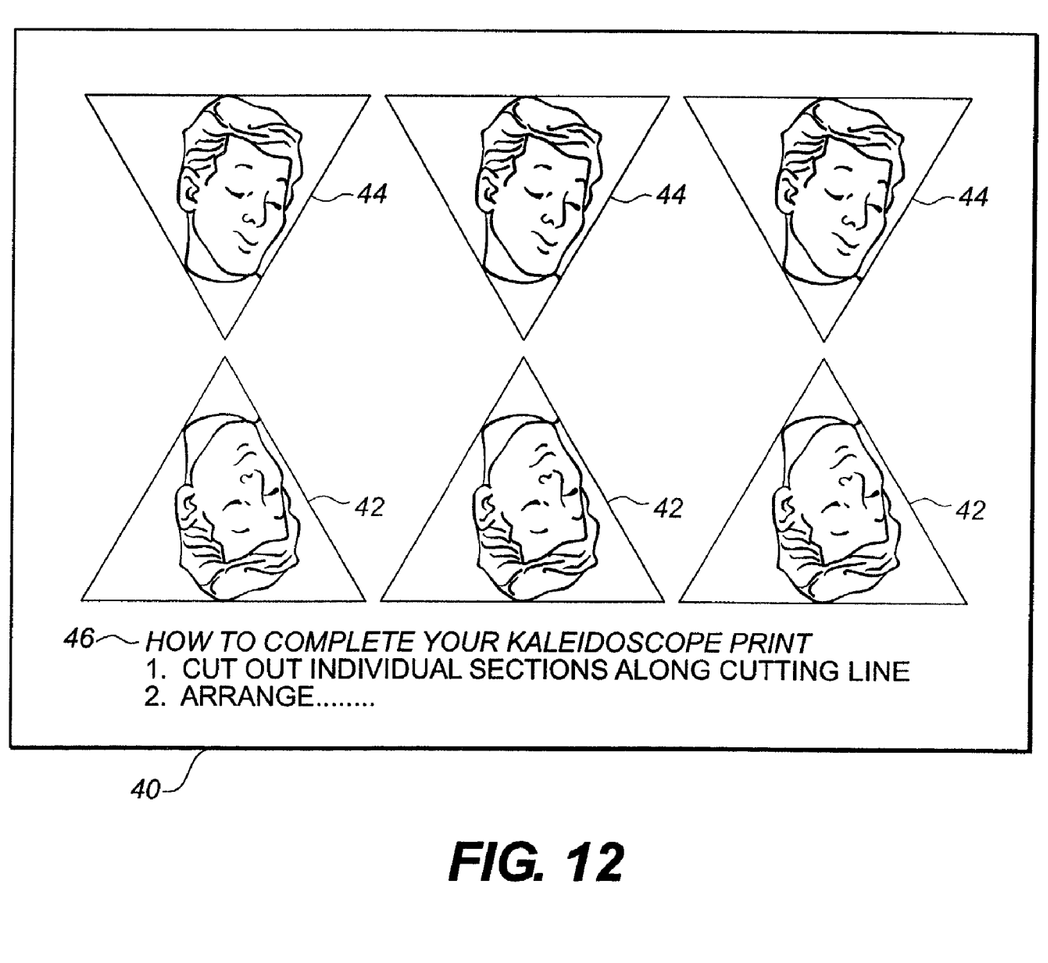
FIG. 12 shows a medium comprising a plurality of visual images and instructions for cutting out and fixing the plurality of visual images to produce a kaleidoscope image.

Since many scrapbookers enjoy the actual cutting and arranging aspect of scrapbooking, the kaleidoscope image might be presented in a format suitable for cutting and fixing by the scrapbooker. A service provider can provide kaleidoscope image 22 having such a format. That is, a service provider would be employed to provide a plurality of images which can be cut and fixed to construct the kaleidoscope image. More particularly, in first display area 28, predetermined window 30 would be moved over image 24 to select a portion of a displayed image and automatically create, from the selected portion, a plurality of windowed images 36. Then, in second display area 38, kaleidoscope image 22 would be simultaneously displayed, with kaleidoscope image 22 comprising windowed images 36 created using the portion selected in first display area 28. A mirrored portion is generated by mirroring the selected portion about one of its edges and automatically creating a plurality of mirrored images 36' from the mirrored portion. A service provider would form visual images of the plurality of windowed images 36 and mirrored images 36' on a medium. The service provider would further provide instructions on the medium for cutting out and fixing the plurality of visual images to produce kaleidoscope image 22 having a symmetrical design. The service provider can then store, print, or transfer the medium comprising the visual images and instructions. If printed, the medium preferably comprises the archival properties and quality desired by a scrapbooker. FIG. 12 shows an example of a medium 40 comprising a plurality of visual images comprised of a plurality of windowed images 42 and mirrored images 44 which can be cut and fixed. Instructions 46 are provided for cutting and fixing the visual images to produce a kaleidoscope image, which for the visual images of medium 40, will produce kaleidoscope image 22 shown in FIG. 3.

In an alternate embodiment, the user only submits windowed image 36 to a service provider from which the service provider can store, print, or transfer a kaleidoscope image. In this embodiment, second display area 38 is not employed.

That is, a user would move predetermined window 30 to select, in first display area 28, a portion of displayed image 24 to create windowed image 36. Kaleidoscope image 22 is not displayed in second display area 38. Rather, windowed image 36 is transmitted over a communication channel to a service provider with instructions 46 to the service provider to produce a kaleidoscope image using windowed image 36. The service provider generates a kaleidoscope image comprising a plurality of transmitted windowed images 36. The service provider provides the user with a scrapbook page including the kaleidoscope image produced thereon. The scrapbook page can be provided by mail, email, or through a retail store. The scrapbook page provided may be suitable for insertion in a scrapbook album, though the scrapbooker may edit the scrapbook page prior to inserting in the scrapbook album. If sent electronically, the user would need to access a printer or other device if the user desires a print of the kaleidoscope image. Payment to the service provider for the kaleidoscope image can be made by means of the communication channel.

In a further embodiment, the user may only submit windowed image 36 to a service provider from which the service provider can store, print, or transfer medium 40 comprising the visual images and instructions 46. In this embodiment, second display area 38 is not employed. That is, a user would move predetermined window 30 to select, in first display area 28, a portion of displayed image 24 to create windowed image 36. Kaleidoscope image 22 is not displayed in second display area 38. Rather, windowed image 36 is transmitted over a communication channel to a service provider. The service provider generates a mirrored portion by mirroring windowed image 36 about one of its edges and automatically creates a plurality of mirrored images from the mirrored portion. The service provider then forms visual images of the plurality of windowed images 36 and mirrored images on medium 40 and provides instructions 46 on medium 40 for cutting out and fixing the plurality of visual images to produce the kaleidoscope image. The service provider sends medium 40 comprising the visual images and instructions to the user. Medium 40 can be sent by mail, email, or through a retail store. If sent electronically, the user would need to access to a printer or other device if the user desires a print of the kaleidoscope image. Payment to the service provider for the kaleidoscope image can be made by means of the communication channel.

Figure 13:
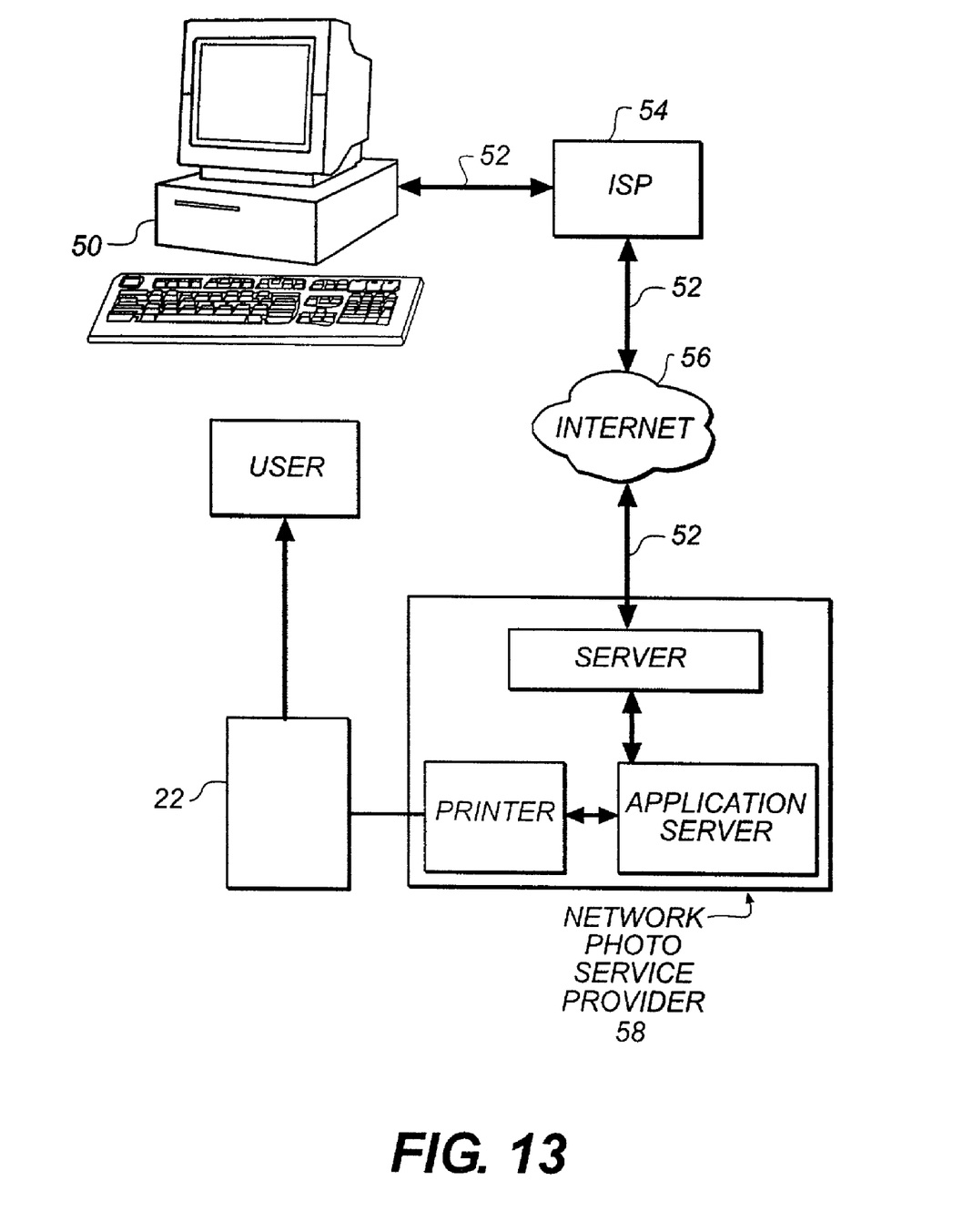
FIG. 13 shows a schematic diagram showing the use of a communications network for communicating with a service provider to construct a kaleidoscope image in accordance with the present invention.

Referring to FIG. 13, when employing a service provider, a computer 50, such as a home or personal computer, can be used as image producing device 10 for viewing image 24. The communications channel for transmitting windowed image 36 is generally shown in FIG. 13 at 52, with communication being accomplished by means of an internet service provider (ISP) 54 and the internet 56 to a service provider 58.

Figure 14:
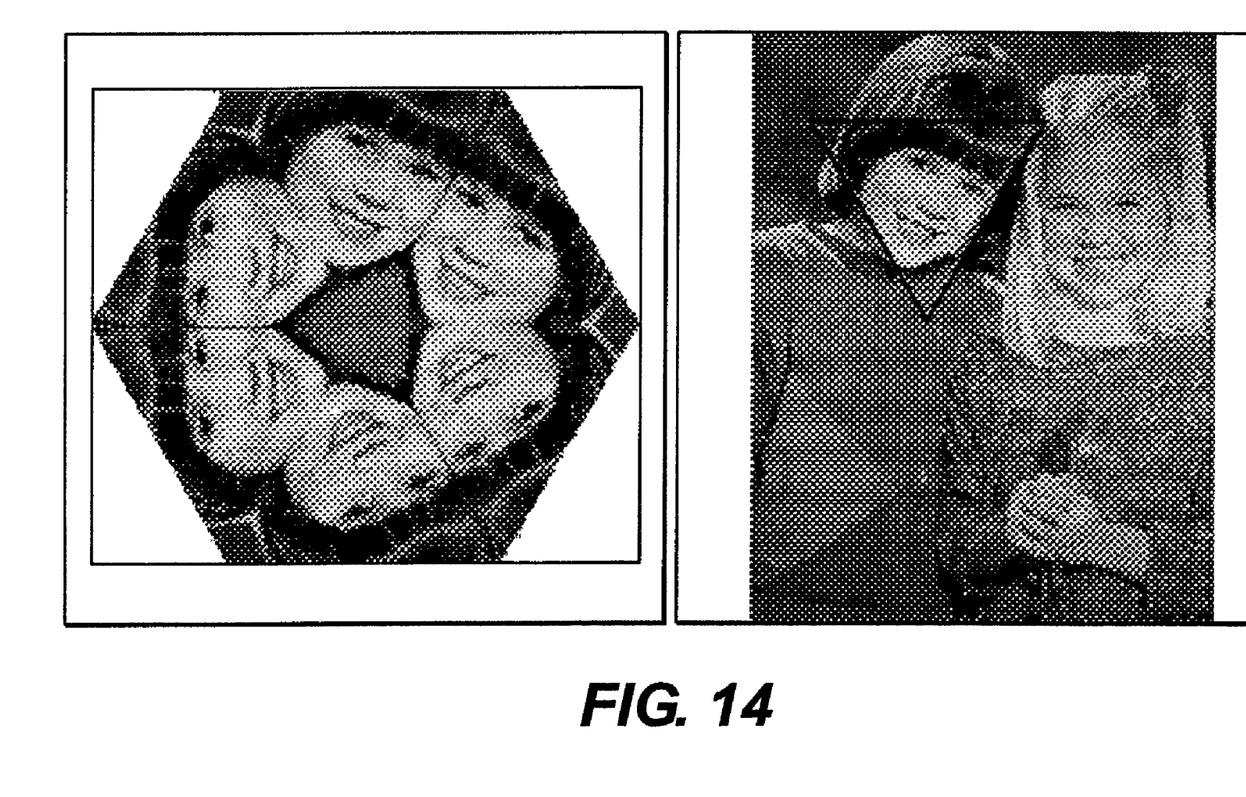
FIG. 14 shows an pleasing kaleidoscope image produce using a user-supplied image in accordance with the present invention.

FIG. 14 provides an example of an aesthetically pleasing kaleidoscope image produce using a user-supplied image.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention. The present invention can comprise a computer storage product having at least one computer storage medium having instructions stored therein causing one or more computers to perform any one of the methods disclosed herein.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 image producing device
12 display
13 keyboard
14 scanner
15 input port
16 delivery section
18 computer
20 printer
22 kaleidoscope image
24 user-supplied visual image
26 removable media reader
27 removable media
28 first display area
30 window
32 instruction area
34 indicators
35 format selector
36 windowed image
38 second display area
40 medium
42 windowed images
44 mirrored images
46 instructions
50 computer
52 communications channel
54 ISP
56 internet
58 service provider
100 step
102 step
104 step

What is claimed is:

1. A method of producing a kaleidoscope image which is usable in a scrapbook, comprising the steps of:
    providing a first display area on a display for displaying an image;
    providing a second display area on the display adjacent to the first display area;
    providing a format selector to enable a selection of a right-handed layout in which the first display area is placed to the right of the second display area when viewed on the display, and a selection of a left-handed layout in which the first display area is placed to the left of the second display area when viewed on the display;
    providing a window on a portion of the image, said window being movable by a user relative to the image displayed in the first display area to produce a windowed image comprised of the portion of the image; and
    simultaneously creating and displaying, in the second display area adjacent the first display area, a kaleidoscope version of the windowed image when the window is moved, said kaleidoscope version having a symmetrical design produced by arranging a series of the windowed image displayed in the first display area.

2. The method of claim 1 wherein the window has a shape which is adjustable.

3. The method of claim 1, wherein the window comprises a triangular, non-regular, diamond, or pie shape.

4. The method of claim 1, further comprising the step of storing, transmitting, or printing the kaleidoscope version of the windowed image for use in the scrapbook.

5. The method of claim 1, wherein the windowed image has an origin, and the kaleidoscope version of the windowed image is produced by radially arranging the series of the windowed image about a center point wherein the origin of each windowed image is disposed at the center point.

6. The method of claim 1, further comprising fixing the kaleidoscope version of the windowed image to a page which can be used in the scrapbook.

7. The method of claim 1, wherein the window comprises a triangular shape and the windowed image has an origin and at least one edge radiating from the origin, and the method further comprises the steps of:

generating a mirrored image by mirroring the windowed image about the at least one edge; and generating the kaleidoscope version of the windowed image by radially arranging a plurality of the windowed images and the mirrored images in an alternating pattern about a center point wherein the origin of each windowed image and mirrored image is disposed at the center point.

8. The method of claim 1, further comprising the step of adjusting the shape or size of the window.

9. A scrapbook page including a kaleidoscope version of an image produced by the method of claim 1.

10. A computer storage product having at least one computer storage medium having instructions stored therein causing one or more computers to perform the method of claim 1.

11. A method of constructing a kaleidoscope image which is usable in a scrapbook, the method comprising the steps of:
  (a) displaying an image on a first display area;
  (b) providing a second display area on the display adjacent to the first display area;
  (c) providing a format selector to enable a selection of a right-handed layout in which the first display area is placed to the right of the second display area when viewed on the display, and a selection of a left-handed layout in which the first display area is placed to the left of the second display area when viewed on the display;
  (d) providing a window on a selected portion of the image displayed in said first display area to automatically create a plurality of windowed images which are simultaneously displayed, in the second display area, as part of a kaleidoscope image;
  (e) adjusting at least one of a position or size of the window to create and display new windowed images which are simultaneously created and displayed in the second display area as part of the kaleidoscope image when the at least one of the position or size of the window is adjusted; and
  (f) selecting one of the displayed kaleidoscope images for transmitting, storage or printing for subsequent use in the scrapbook.

12. The method of claim 11, wherein the displayed kaleidoscope images includes a plurality of mirrored images interspersed with the plurality of windowed images.

13. The method of claim 12, wherein the mirrored image is a mirror image of the windowed image.

14. The method of claim 11, wherein the predetermined window comprises a triangular, non-regular, diamond, or pie shape.

15. The method of claim 11, further comprising the step of adjusting a shape of the window.

16. A scrapbook page including a kaleidoscope image produced by the method of claim 11.

17. A method of constructing a kaleidoscope image which is usable in a scrapbook, the method comprising the steps of:
  (a) displaying an image in a first display area;
  (b) providing a second display area on the display adjacent to the first display area;
  (c) providing a format selector to enable a selection of a right-handed layout in which the first display area is placed to the right of the second display area when viewed on the display, and a selection of a left-handed layout in which the first display area is placed to the left of the second display area when viewed on the display;
  (d) providing a window on a selected first portion of the image displayed in said first display area to create a plurality of windowed images which are simultaneously displayed in the second display area as part of a kaleidoscope image;
  (e) mirroring the first portion of the displayed image and creating a plurality of mirrored images which are displayed as part of the kaleidoscope image by interspersing the plurality of windowed images with the plurality of mirrored images;
  (f) adjusting at least one of a position or size of the window to select new first portions which are simultaneously created and displayed as part of the kaleidoscope image in the second display area, when the at least one of the position or size of the window is adjusted, the new first portions including the windowed and mirrored images; and
  (g) selecting one of the displayed kaleidoscope images for storage and subsequent use in the scrapbook.

18. The method of claim 17, wherein the window comprises a triangular, non-regular, diamond, or pie shape.

19. The method of claim 17, further comprising the step of storing, transmitting, or printing the kaleidoscope image for use in the scrapbook.

20. The method of claim 17, further comprising fixing the kaleidoscope image to a page which can be used in the scrapbook.

21. The method of claim 17, wherein the windowed image has an origin, and the kaleidoscope image is produced by radially arranging the plurality of the windowed images about a center point wherein the origin of each windowed image is disposed at the center point.

22. The method of claim 17, wherein the window comprises a triangular shape and the windowed image has an origin and at least one edge radiating from the origin, and the method further comprises the steps of:

mirroring the first portion by mirroring the first portion about the at least one edge; and generating the kaleidoscope image by radially arranging the plurality of the windowed images and the mirrored images in an alternating pattern about a center point, wherein the origin of each windowed image and mirrored image is disposed at the center point.

23. A scrapbook page including a kaleidoscope image produced by the method of claim 17.

24. A method of constructing a kaleidoscope image which is usable in a scrapbook, comprising the steps of:
   (a) displaying an image on a first display area
   (b) providing a second display area on the display adjacent to the first display area;
   (c) providing a format selector to enable a selection of a right-handed layout in which the first display area is placed to the right of the second display area when viewed on the display, and a selection of a left-handed layout in which the first display area is placed to the left of the second display area when viewed on the display;
   (d) providing a predetermined window on a selected portion of the image displayed in said first display area to automatically create from the selected portion a plurality of windowed images;
   (e) simultaneously creating and displaying, in the second display area, the kaleidoscope image comprising the windowed images created using the selected portion in the first display area;
   (f) generating a mirrored portion by mirroring the selected portion about one of its edges and automatically creating a plurality of mirrored images from the mirrored portion;
   (g) forming visual images of the plurality of windowed images and mirrored images on a medium;
   (h) providing instructions on a medium for cutting out and fixing the plurality of visual images to produce the kaleidoscope image having a symmetrical design; and
   (i) storing, printing, or transferring the medium comprising the visual images and instructions.

* * * * *